(12) United States Patent
Hsieh

(10) Patent No.: US 6,394,174 B1
(45) Date of Patent: May 28, 2002

(54) SYSTEM FOR RECLAIMING PROCESS WATER

(75) Inventor: Yi-Jang Hsieh, Hsin-Chu (TW)

(73) Assignee: Taiwan Semiconductor Manufacturing Company, Ltd, Hsin Chu (TW)

( * ) Notice: Subject to any disclaimer, the term of this patent is extended or adjusted under 35 U.S.C. 154(b) by 0 days.

(21) Appl. No.: 09/240,129

(22) Filed: Jan. 29, 1999

(51) Int. Cl.$^7$ ............................................. B01D 47/00
(52) U.S. Cl. ..................... 165/47; 165/900; 165/921; 165/54; 62/310; 62/314; 62/95; 96/266
(58) Field of Search ..................... 62/310, 314, 91, 62/92, 93, 94, 95; 165/900, 921, 47, 54; 96/266

(56) References Cited

U.S. PATENT DOCUMENTS

| | | | | |
|---|---|---|---|---|
| 1,986,529 A | * | 1/1935 | Ray | 62/310 |
| 2,480,286 A | * | 8/1949 | Collis | 62/310 |
| 2,825,210 A | * | 3/1958 | Carr | 62/314 |
| 2,902,414 A | * | 9/1959 | Schmerzler | 62/92 |
| 3,116,612 A | * | 1/1964 | Pennington | 62/310 |
| 4,156,351 A | * | 5/1979 | Schlom et al. | 62/310 |
| 4,799,941 A | * | 1/1989 | Westermark | 96/266 |
| 5,217,508 A | * | 6/1993 | Jonsson | 96/266 |
| 5,716,428 A | * | 2/1998 | Imasura | 96/266 |
| 2001/0029844 A1 | * | 10/2001 | Chung | 96/266 |

FOREIGN PATENT DOCUMENTS

| | | | | |
|---|---|---|---|---|
| DE | 374920 | * | 5/1921 | 62/314 |
| EP | 000479092 | * | 4/1992 | 165/900 |
| WO | WO 91/07623 | * | 5/1991 | 165/921 |

* cited by examiner

Primary Examiner—John K. Ford
(74) Attorney, Agent, or Firm—Randy W. Tung

(57) ABSTRACT

The present invention generally relates to a system and a method for reclaiming process water in a manufacturing plant and more particularly, relates to a system and a method for reclaiming process water from a cooling tower exhaust gas which contains at least 80% relative humidity by utilizing a heat exchanger equipped with cooling elements that are cooled by a flow of exhaust gas formed by a general exhaust and a scrubber exhaust from a semiconductor fabrication facility.

10 Claims, 2 Drawing Sheets

SYSTEM FOR RECLAIMING PROCESS WATER

FIELD OF THE INVENTION

The present invention generally relates to a system and a method for reclaiming process water in a manufacturing plant and more particularly, relates to a system and a method for reclaiming process water from a cooling tower exhaust gas which contains at least 80% relative humidity by utilizing a heat exchanger equipped with cooling elements that are cooled by a flow of exhaust gas formed by a general exhaust and a scrubber exhaust from a semiconductor fabrication facility.

BACKGROUND OF THE INVENTION

In various semiconductor fabrication processes, the effluent gases from a process chamber must be treated before they can be released into a factory exhaust system and into the atmosphere. It is known that a large number of reactant gases and their reaction products utilized in semiconductor fabrication processes are highly flammable or highly toxic. The spent reactant gases that are discharged out of the process chamber may contain gases that have not been reacted or have been only partially reacted and therefore must be treated before they can be released into the atmosphere.

In a semiconductor fabrication facility, the treatment of the exhaust gases generated from the facility is an important aspect of the total fabrication processes. Various exhaust gases are produced in a semiconductor fabrication facility, these include general exhaust, scrubbed exhaust and solvent exhaust. For discharging the general exhaust and the solvent exhaust, a system typically includes ductworks, exhaust fans, by-passes, and stacks can be used. For handling the scrubbed exhaust, a scrubber must be used for treating the exhaust before they can be released into the atmosphere. A by-pass system can be provided which allows the drawing of outside air when the pressure at the suction side of the blower exceeds a preset value.

In a general exhaust system, heat dissipated by the process equipment is normally removed. The general exhaust therefore does not normally contain acids, caustics or solvents. In a solvent exhaust system, air containing solvents from the process equipment is removed. The devices utilized in the exhaust system therefore must be explosion-proof for safety reasons. In the scrubbed exhaust system, air containing acids, caustics and other harmful chemicals from the process chamber is removed. Various caustics in the exhaust gases such as ammonia, silane or other toxic gases must be treated by a scrubber before releasing into the atmosphere. A wet scrubber is normally used to remove acids and caustics in a process chamber exhaust by washing the air with a solvent such as water. City water is adequate for such purpose. The waste water from the scrubber is then sent to a neutralization plant in a waste treatment area of the fabrication facility. A dry scrubber can also be used to remove caustics substances from a process chamber exhaust by absorbing the substances into a scrubber material which is typically maintained at an elevated temperature. The scrubber material can then be replaced when it is saturated with the toxic substances.

The various exhaust systems are connected to process machines via ductworks. For instance, when exhausting from a metal etcher, a chemical vapor deposition chamber or a sputter, spent reactant gases and reaction by-products are normally discharged into a scrubbed exhaust system for treatment before the exhaust can be released into the atmosphere. A typical system for treating exhaust gases from a semiconductor process chamber such as an etcher is shown in FIG. 1.

Referring initially to FIG. 1, wherein a semiconductor fabrication system 10 is shown. The fabrication system 10 consists of an etcher 12, a vent exhaust 14, a main booster pump 16, a dry pump 22, a nitrogen purge gas supply 24 and a wet scrubber 26. Into the metal etcher 12, carrier gases and etchant gases (not shown) are first fed into the chamber through various valve openings (not shown). An inert gas such as pure nitrogen is normally used either as a carrier gas for the etchant gases or as a purge gas when venting of the chamber to atmospheric pressure is needed. In a typical metal etching application, etchant gases such as $Cl_2$ and $BCl_3$ are used. In a batch-type metal etcher where a plurality of wafers, i.e., 16 wafers in a column type etcher, are etched in a typical etching process. In order to achieve an effective etching rate for a large number of wafers, a high concentration of etchant gas must be utilized in the etch chamber 12. The exhaust gases discharged from the etcher 12 at the outlet port 18 therefore contains a high concentration of un-spent etchant gases and other etching reaction by-products. The vent exhaust 14 is provided for venting of the pure nitrogen used to purge out the etch chamber 12 after an etching reaction. The un-spent etchant gases are discharged out of the etching chamber 12 by the main booster pump 16. A dry pump 22 is subsequently used to deliver the un-spent etchant gases into a wet scrubber 26

The pump exhaust system 30 which includes the main booster pump 16, the dry pump 22 and the dry nitrogen source 24 are controlled by a series of valves (not shown). When the valves between the etcher 12 and the main booster pump 16 are opened, exhaust gases exit outlet port 18 and pass through the passageway 28 to enter into the main booster pump 16. The main booster pump 16 acts as the front stage pump and the dry pump 22 acts as the back stage pump, which work together to provide a vacuum that is sufficiently high for the etch chamber 12 prior to an etching process. The exhaust gases exit the dry pump 22 through passageway 34 and enter the wet scrubber 26 through an inlet port 20. During a normal etching process, chamber 12 is first evacuated by the operation of the main booster pump 16 and the dry pump 22 to a suitable vacuum for conducting the etching process. Etchant gases then enter into the chamber to commence the etching process on the wafers. A suitable chamber pressure is maintained during such etching process.

FIG. 2 is a schematic illustrating a detailed view of the exhaust gas conduit 34 and the wet scrubber 26 shown in FIG. 1. It is seen that exhaust gases 38 delivered from the dry pump 22 enter inlet 42 of the exhaust gas conduit 34. The exhaust gas conduit 34 is normally constructed of stainless steel such that it can be maintained at an elevated temperature of approximately 120° C. by heaters 44 to reduce the potential of particulate depositions in the conduit 34. As the exhaust gases 38 enter the wet scrubber 26 through the inlet port 20, the exhaust gases 38 are washed by a cleaning solvent 48 dispensed from a spray head 50. The cleaning solvent 48 is first supplied from a solvent reservoir (not shown) through conduit 52. A commonly used cleaning solvent for a wet scrubber is city water. After being scrubbed by the cleaning solvent 48, the exhaust gases 38 exit the wet scrubber 26 through an exhaust outlet port 46 into a factory exhaust system (not shown). The spent cleaning solvent 38 is collected by the solvent collection device 54 and then transported through conduit 56 into a spent solvent collection tank 58.

It should be noted that, in the application of a wet scrubber for a metal etcher, the spent water collected in the collection tank 58 is maintained at a pH value between about 6 and about 6.3. In other words, the spent city water is allowed to be slightly acidic after it is used to scrub the exhaust gases. The effectiveness of the wet scrubbing operation is maintained by continuously adding fresh city water to the spent water collection tank 58 and recirculating the water through the scrubbing process as long as the pH value of the spent water is between the values described above.

The exhaust gas 62 exiting the wet scrubber 26 through the exhaust outlet port 46 is normally directly fed into a factory exhaust system. The exhaust gas 62 is normally cooled by city water to a low temperature such as between about 18° C. and about 200° C. The low temperature exhaust gas 62 is therefore wasted when its cooling capacity is not utilized.

The exhaust gas 62 further contains a high moisture content between about 80% and about 100% relative humidity, resulting in a large waste of process water used in the fabrication plant.

In a semiconductor fabrication facility where clean rooms are widely used, the general exhaust from the clean rooms is also kept at a low temperature of about 24° C. The general exhaust must be continuously released into the atmosphere in order to replenish the fresh air environment in the clean room. The cooling capacity of the general exhaust gas, i.e., maintained at 24° C., is therefore not utilized when exhausted into the atmosphere.

To maintain the clean room temperature of approximately 24° C., the clean room air is supplied by an air conditioning unit that utilizes cooling tower 64. A heat exchanger in the cooling tower utilizes city water for cooling the clean room air 66 that circulates through the cooling tower. An exhaust air 68, which is blown through the cooling elements 70 in the cooling tower 64, carries the heat transferred from the clean room air 66 in a temperature range between about 32° C. and about 34° C. The exhaust air 68 further contains a high moisture level between about 80% and about 100% relative humidity, and more likely between about 90% and about 100% relative humidity. The high moisture content of the cooling tower exhaust gas is contributed by the cooling water that is sprayed on the cooling elements 70. The high water content of the exhaust gas results in a large waste of process water used in the fabrication plant. It is therefore highly desirable if the water content in the cooling tower exhaust gas can be recovered.

It is therefore an object of the present invention to provide a system for reclaiming process water in a fabrication plant that does not have the drawbacks or shortcomings of a conventional system.

It is another object of the present invention to provide a system for reclaiming process water in a fabrication plant that utilizes the cooling capacity of factory exhaust gas that is otherwise wasted.

It is a further object of the present invention to provide a system for reclaiming process water in a fabrication plant by utilizing the cooling capacity of a factory exhaust air consisting of general exhaust and scrubber exhaust.

It is another further object of the present invention to provide a system for reclaiming process water in a fabrication plant by recovering the moisture content in a cooling tower exhaust air utilizing the cooling capacity of a low temperature factory exhaust air from clean room and from process machines.

It is still another object of the present invention to provide a system for reclaiming process water in a fabrication plant by recovering from a cooling tower exhaust air which contains at least 90% relative humidity by cooling the exhaust air with a factory exhaust air maintained at about 20° C.

It is yet another object of the present invention to provide a method for reclaiming process water by utilizing a low temperature exhaust air from clean room and scrubber machines for condensing the water content in a cooling tower exhaust air.

It is still another further object of the present invention to provide a system for reclaiming energy from an exhaust gas by passing a fluid flow over cooling elements that are cooled by a low temperature factory exhaust air wherein the fluid flow may be a high moisture content exhaust gas from a cooling tower.

It is yet another further object of the present invention to provide a system for reclaiming energy from an exhaust gas wherein a fluid flow that contains at least 80% relative humidity is passed over cooling elements that are cooled by an exhaust gas at a temperature of not higher than 24° C.

SUMMARY OF THE INVENTION

In accordance with the present invention, a system and a method for reclaiming process water by utilizing a low temperature factory exhaust air are provided.

In a preferred embodiment, a system for reclaiming process water from a cooling tower can be provided which includes a heat exchanger equipped with cooling elements, a gas inlet and a gas outlet, a flow of exhaust gas having a temperature not higher than 24° C. for passing through cavities in the cooling elements, a cooling tower for producing an effluent gas containing at least 80% relative humidity for feeding to the gas inlet of the heat exchanger and for passing over the cooling elements and exiting through the gas outlet, and a water collecting means for collecting water condensed on the cooling element.

In the system for reclaiming process water from a cooling tower exhaust, the cooling elements may be heat exchanger tubes. The flow of exhaust gas may have a temperature not higher than 22° C. The flow of exhaust gas may be composed of a general exhaust gas and a scrubber exhaust gas from a semiconductor fabrication plant. The flow of exhaust gas may be composed of a general exhaust gas which has a temperature of about 24° C. and a scrubber exhaust gas which has a temperature of about 18° C.

In the system, the flow of effluent gas from the cooling tower may contain between about 80% and about 100% water, or preferably contain between about 90% and about 100% water. The flow of effluent gas from the cooling tower may have a temperature of at least 32° C., or a temperature between about 32° C. and about 34° C. The water condenses on the cooling elements when the effluent gas passes over the cooling elements. The water collected by the water collecting means may be flown into the cooling tower for reuse.

The present invention is further directed to a method for reclaiming process water from a cooling tower which can be carried out by the operating steps of first providing a heat exchanger equipped with cooling elements, a gas inlet and a gas outlet, providing a cooling tower for producing an effluent gas containing at least 80% relative humidity, flowing an exhaust gas which has a temperature not higher than 22° C. through the cooling elements in the heat exchanger, flowing the effluent gas from the cooling tower into the gas inlet of the heat exchanger for passing over the cooling elements to exit through the gas outlet, and collecting water condensed on the The method for reclaiming process water from a cooling tower may further include the step of mixing a general exhaust gas and a scrubber exhaust gas to form the flow of exhaust gas. The method may further include the step of forming the exhaust gas by mixing a general exhaust gas a temperature of about 24° C. and a scrubber exhaust gas at a temperature of about 18° C. The method may further include the step of producing the effluent gas in the cooling tower containing at least 90% relative humidity, or the step of producing the effluent gas in the cooling tower which has a temperature of at least 32° C., or between about 32° C. and about 34° C. The method may further include the step of flowing the water collected from the cooling element into the cooling tower for reuse.

The present invention is further directed to a system for reclaiming energy from an exhaust gas which includes a heat exchanger equipped with cooling elements, a gas inlet and a gas outlet, a flow of exhaust gas which has a temperature not higher than 24° C. for passing through cavities in the cooling elements, and a fluid flow for passing over the cooling elements for exchanging thermal energy with the flow of exhaust gas.

In the system for reclaiming energy from an exhaust gas, the fluid flow may be a high temperature and high humidity content exhaust air from a cooling tower. The fluid flow may contain at least 80% relative humidity at a temperature of at least 32° C. such that water condenses on the cooling element. The fluid flow may be a liquid that has a temperature of more than 24° C. for exchanging thermal energy with the flow of exhaust gas. The system may further include a liquid collecting means for collecting liquid condensed on the cooling elements in the heat exchanger. The flow of exhaust gas may have a temperature of not higher than 22° C. The flow of exhaust gas may include a general exhaust and a scrubber exhaust from a semiconductor process plant.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

Figure 1:
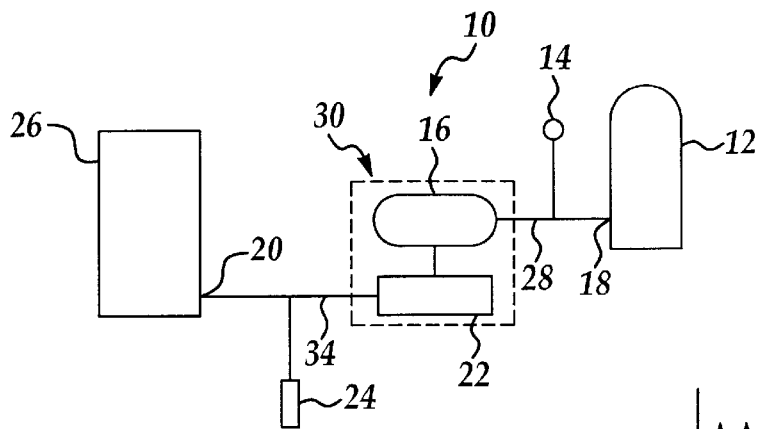
FIG. 1 is a schematic illustrating a conventional semiconductor fabrication system including an etcher, a main booster pump, a dry pump and a wet scrubber.
Figure 2:
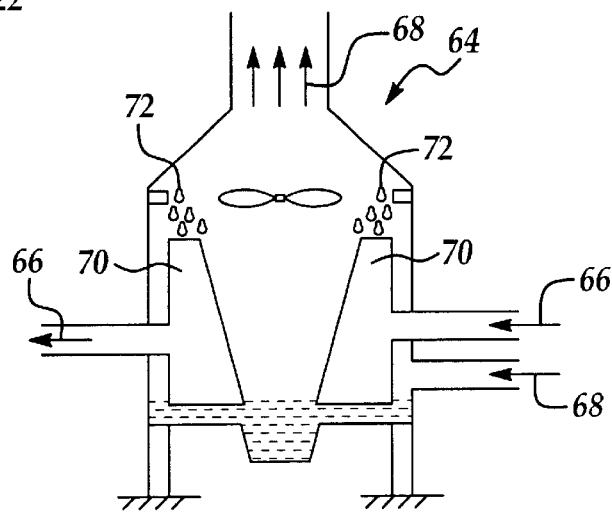
FIG. 2 is a schematic illustrating the exhaust gas conduit and the wet scrubber of FIG. 1.

The present invention discloses a system and a method for reclaiming process water from a cooling tower exhaust air by utilizing a low temperature exhaust gas from a semiconductor fabrication facility. The low temperature exhaust gas from the fabrication facility may include general exhaust air from clean rooms which is normally kept at a temperature of about 24° C., and exhaust air from wet scrubbers which is normally kept at a temperature of about 18° C. The high moisture content in the cooling tower exhaust air, i.e., between about 80% and about 100% and more likely, between about 90% and about 100% relative humidity exists at a high temperature of about 32~34° C. By utilizing the present invention novel system for reclaiming the process water, approximately between about 60% and about 70% of the moisture content in the cooling tower exhaust air can be recovered and reused. It should be noted that while the present invention system and method are suitable for use in a semiconductor fabrication facility, the system and method can be used in any other manufacturing facilities to achieve equally desirable result.

In the system disclosed for reclaiming process water from a cooling tower exhaust air of the present invention, the system may include a heat exchanger that is equipped with cooling elements such as cooling tubes, a gas inlet and a gas outlet; a cooling tower for producing an effluent gas (or exhaust gas) which contains at least 80% relative humidity and is fed to the gas inlet of the heat exchanger for passing over the cooling elements; a source of exhaust gas supply which has a temperature not higher than 24° C. for passing through cavities in the cooling elements; and a water collecting means for collecting condensed water from the cooling elements.

The present invention further discloses a method for reclaiming process water from a cooling tower exhaust air which can be carried out by first providing a heat exchanger that has cooling elements, a gas inlet and a gas outlet, then providing a cooling tower for producing an effluent gas containing at least 80% relative humidity, then flowing an exhaust gas which has a temperature not higher than 22° C. through the cavities in the cooling elements, flowing the effluent gas from the cooling water into the gas inlet of the heat exchanger for passing over the cooling elements, and collecting water condensed on the cooling elements.

The present invention still further discloses a system for reclaiming energy from an exhaust gas which includes a heat exchanger that is equipped with cooling elements, a gas inlet and a gas outlet, a flow of exhaust gas which has a temperature of not higher than 24° C. for passing through cavities in the cooling elements, and a fluid flow for passing over the cooling elements for exchanging thermal energy with the flow of exhaust gas. The fluid flow may be either a liquid or a gas. When the fluid flow is a liquid, the liquid temperature will drop after a thermal energy transfer to a low temperature exhaust gas which is flown through the cooling elements. When the fluid flow is a gas containing high humidity, the humidity content of the gas can be recovered by a condensation of the humidity on the cooling element.

Figure 3:
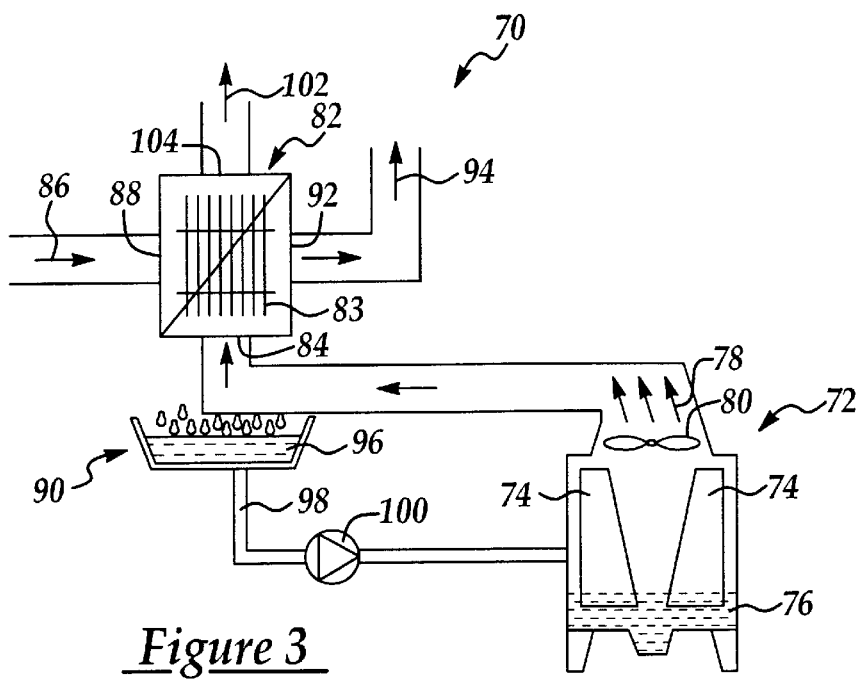
FIG. 3 is a schematic illustrating the present invention system for reclaiming process water by utilizing a low temperature exhaust gas.
Figure 2A:
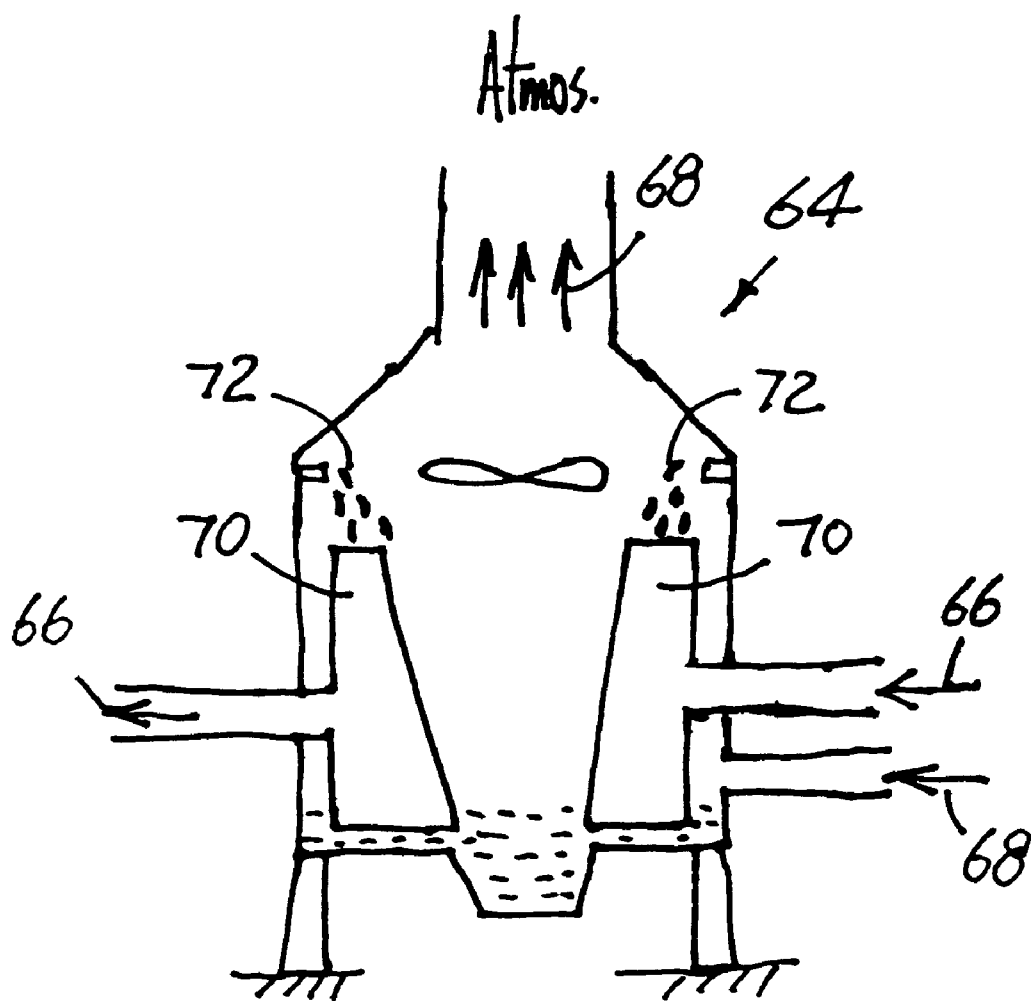
FIG. 2A is a schematic illustrating another conventional method for cooling the clean room air by an exhaust gas.

Referring now to FIG. 3 wherein a schematic of the present invention novel system 70 is shown. In the system 70, a cooling tower 72 is utilized which is equipped with cooling plates 74 and cooling water 76 is sprayed on the cooling tubes 74. A large air flow 78 is blown through the cooling tubes 74 by a blower 80 to generate cooling tower exhaust gas 78 containing a high moisture content.

By utilizing the present invention system 70, the cooling tower exhaust air 78 is fed into a condenser 82 equipped with cooling elements 83 through a first inlet 84. The exhaust gas 78 from the cooling tower 72, after absorbing heat transferred from the clean room air, is normally at a temperature between about 32° C. and about 34° C. The high temperature exhaust air 78 further contains a high humidity content due to the high moisture content in the cooling tower 72. For instance, the humidity level in the exhaust air 78 is normally between about 80% and about 100% relative humidity, and more likely, between about 90% and about 100% relative humidity. The hot humid air 78 enters the inlet 84 of the condenser 82 and passes over cooling elements (not shown) in the condenser 82.

Into the cavities of the cooling elements, a factory exhaust gas which normally contains a general exhaust gas from the clean rooms and a scrubber exhaust gas from the wet scrubber machines is fed. The general exhaust gas from the clean room environment is normally maintained at a temperature of between about 22° C. and about 24° C. The scrubber exhaust gas is normally maintained at a temperature between about 18° C. and about 20° C. The exhaust air from the wet scrubber is normally at a lower temperature than the general exhaust air from the clean rooms. A mixture of the general exhaust air and the scrubber exhaust gas may result in a final temperature of about 22° C. or in a range between about 22° C. and about 24° C. The mixture is fed into the condenser elements and shown as exhaust gas flow 86 in FIG. 3. The low temperature exhaust gas 86 is fed into the condenser 82 through a second inlet 88. After the low temperature exhaust gas 86 is flown through the cooling elements in the condenser 82, the exhaust gas 86 increases its temperature and exits at outlet port 92 as exhaust air 94 for feeding into a factory exhaust system which is then released into the atmosphere. Similarly, after the high temperature and high humidity exhaust air 78 passes through the condenser 82, the high moisture content of the exhaust air 78 is condensed into a water collecting device 90. The water 96 collected can then be fed into the cooling tower 72 for reuse through conduit 98 and pump 100. It has been found that approximately between about 60% and about 70% of the moisture content in the exhaust air 78 from the cooling tower can be recovered by the present invention novel method. The dried exhaust air 102 exits the condenser 82 through an output port 104 into a factory exhaust pipe for releasing into the atmosphere. The exhaust air 102 is significantly dried and cooled after passing through the cooling elements in the condenser 82 before it is released into the atmosphere.

The present invention novel method therefore utilizes the cooling capacity of low temperature exhaust air that would otherwise be wasted and released into the atmosphere for cooling high temperature, high humidity content exhaust air from a cooling tower. As a result, approximately between 60~70% of the humidity content in the cooling tower exhaust air can be recovered and reused. The present invention novel method therefore realizes an energy saving goal by recycling a significant amount of process water.

The present invention novel system and method have therefore been amply demonstrated in the above descriptions and in the appended drawing of FIG. 3. While the present invention has been described in an illustrative manner, it should be understood that the terminology used is intended to be in a nature of words of description rather than of limitation.

Furthermore, while the present invention has been described in terms of a preferred and an alternate embodiment, it is to be appreciated that those skilled in the art will readily apply these teachings to other possible variations of the inventions.

The embodiment of the invention in which an exclusive property or privilege is claimed are defined as follows:

1. A system for reclaiming process water from a cooling tower exhaust from a semiconductor fabrication plant comprising:

a semiconductor fabrication plant, a source of general exhaust gas from rooms within said semiconductor fabrication plant, scrubber exhaust gas from semiconductor fabrication systems within said rooms of said semiconductor fabrication plant, a heat exchanger equipped with cooling elements, a gas inlet and a gas outlet, a flow of exhaust gas having a temperature not higher than 24° C. for passing through cavities in said cooling elements, wherein said flow of exhaust gas being composed of said general exhaust gas and said scrubber exhaust gas, a cooling tower for producing an effluent gas containing at least 80% relative humidity, a conduit for feeding said effluent gas to said gas inlet of said heat exchanger and for passing over said cooling elements and exiting through said gas outlet, and a water collecting means for collecting water condensed on said cooling elements.

2. A system for reclaiming process water from a cooling tower according to claim 1, wherein said cooling elements are heat exchanger tubes.

3. A system for reclaiming process water from a cooling tower according to claim 1, wherein said flow of exhaust gas having a temperature not higher than 22° C.

4. A system for reclaiming process water from a cooling tower according to claim 1, wherein said flow of exhaust gas being composed of a general exhaust gas having a temperature of about 24° C. and a scrubber exhaust gas having a temperature of about 18° C.

5. A system for reclaiming process water from a cooling tower according to claim 1, wherein said flow of effluent gas from said cooling tower contains between about 80% and about 100% water.

6. A system for reclaiming process water from a cooling tower according to claim 1, wherein said flow of effluent gas from said cooling tower contains between about 90% and about 100% water.

7. A system for reclaiming process water from a cooling tower according to claim 1, wherein said flow of effluent gas from said cooling tower has a temperature of at least 32° C.

8. A system for reclaiming process water from a cooling tower according to claim 1, wherein said flow of effluent gas from said cooling tower has a temperature of at least 34° C.

9. A system for reclaiming process water from a cooling tower according to claim 1, wherein water condenses on said cooling elements when said effluent gas passes over said cooling elements.

10. A system for reclaiming process water from a cooling tower according to claim 1, wherein water collected by said water collecting means is flown into said cooling tower for reuse.

* * * * *